Jan. 31, 1956   W. A. STEVENS   2,733,097
PROTECTIVE TRIM FOR AUTOMOBILE DOORS
Filed Jan. 15, 1953

INVENTOR
William A. Stevens
BY Jewett, Mead, Brown & Schuyler
ATTORNEYS

United States Patent Office 2,733,097
Patented Jan. 31, 1956

2,733,097
PROTECTIVE TRIM FOR AUTOMOBILE DOORS

William A. Stevens, Athens, Ga.

Application January 15, 1953, Serial No. 331,464

1 Claim. (Cl. 296—44)

This invention relates to protective trim for automobile doors and is directed primarily to the problem of protecting the edges of automobile doors from damage.

The present invention has particular utility in connection with the outwardly swinging vertical edge of an automobile door since this edge is especially vulnerable to being damaged when the door is swung open against a wall, adjacent automobile, or the like. It is not uncommon to see the outwardly swinging vertical edges of automobile doors having chipped paint, nicks, or even more extensive damage because they have been swung open against some obstruction such as those just mentioned. This is true even though the remainder of the door panel may be substantially unmarred.

In order to be practical for the purpose intended, a protective trim for automobile doors should be extremely difficult to mark itself so that the trim resists damage, should fit the door edge to which it is applied, should not come loose or rattle after it has been applied, and should be ornamental so that it will enhance rather than detract from the appearance of the door. It is thus apparent that to be fully satisfactory a protective trim must meet a number of exacting factors. Therefore, while there have been various arrangements proposed for protecting the edges of automobile doors from damage, to my knowledge none is completely satisfactory because of failure to meet all of the factors mentioned above.

It is accordingly an object of the present invention to provide a new and improved automobile door edge construction including a protective trim for protecting the door edge. Further objects of the present invention are to provide such a trim which is difficult to mark and therefore resists damage, which can be accurately fitted to and firmly attached to an automobile door edge so that it will not come loose or rattle in service, and which is ornamental so that it enhances, rather than detracts from, the appearance of the door.

Briefly stated, an automobile door edge construction in accordance with the teaching of the present invention comprises a flange which projects from the body of the door in extension of the exterior surface of the door, the projecting extremity of the flange constituting one edge of the door proper. A protective trim strip is attached to this flange and extends lengthwise along the length of the flange, conforming to the lengthwise curvature of the flange, and also extends from the projecting extremity of the flange back toward the body of the door. Thus, the trim strip, which has a substantially uniform width, covers a substantial portion of the flange.

The trim strip will preferably be made of metal, such as polished stainless steel, and is preferably affixed to the flange by positive retaining means which engage the flange to hold the strip in place. The trim strip is of such thickness that it can be shaped to conform to the contour of the flange and thus, when fixedly connected to the flange, produces a composite door edge construction which comprises both the door edge flange and the trim strip. Furthermore, the trim strip has a curved longitudinal edge portion which engages and conforms to the curvature of the projecting extremity of the door flange, thus protecting this extremity. The composite edge construction therefore has much greater resistance against damage than does the unprotected flange alone.

Other objects and advantages of the present invention will become more apparent from the following detailed description taken in conjunction with the attached drawing in which.

Figure 1:
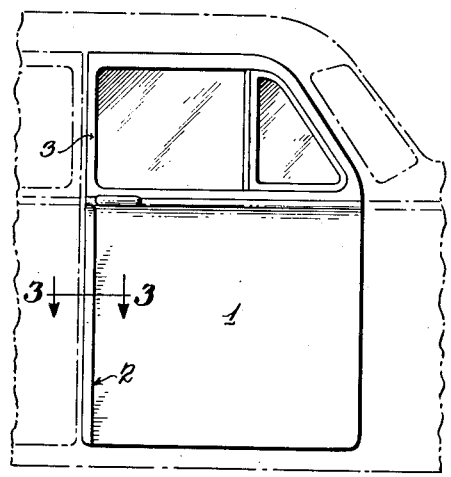
Fig. 1 is an exterior side elevation view of an automobile door, a portion of the body of the automobile being shown in dotted outline, one edge of the automobile door having a protective trim attached thereto and positioned thereon in accordance with one embodiment of the present invention.

As has been previously mentioned, the present invention has particular utility for protecting the outwardly swinging vertical edge of an automobile door from being damaged when the door is swung open against some obstruction. Accordingly, Fig. 1 shows an automobile door, indicated generally by the reference numeral 1, having a protective trim strip, indicated generally by the reference numeral 2, attached to and extending along a major portion of the length of the outwardly swinging edge 3 of the door.

Figure 2:
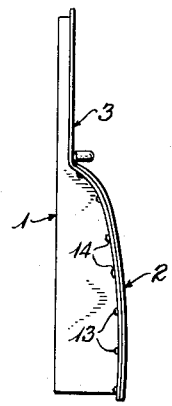
Fig. 2 is an end view in elevation of the automobile door shown in Fig. 1.

As viewed endwise in Fig. 2, the trim strip 2 is seen as conforming to the longitudinal contour of the door edge 3 and is attached to and extends along the bulging-out portion of this door edge so that it protects that portion of the door which is most likely to encounter an obstruction when the door is opened.

Figure 3:
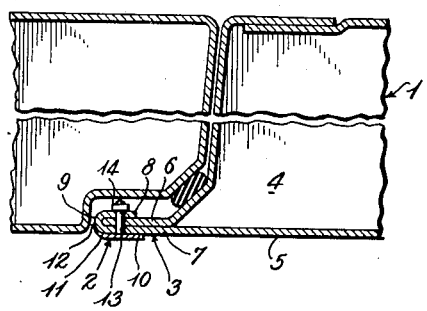
Fig. 3 is a sectional view, partly broken away, taken on line 3—3 of Fig. 1.

As can be observed from Fig. 3, the substantially vertical door edge 3 is actually a flange which projects from the body 4 of the door in extension of the exterior surface 5 of the door. Thus, the flange 3 is constituted of a flange portion 6 which projects from the door body 4 and a flange portion 7 which projects in extension of the exterior surface 5 of the door and is lapped about the outer edge of flange portion 6 so that flange portion 7 terminates in an edge 8 located at the inner side of the flange as shown in Fig. 3. It is thus apparent that, adjacent its projecting extremity, flange or edge 3 has a triple thickness of sheet metal.

Figure 4:
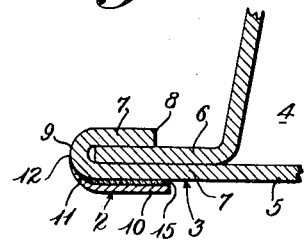
Fig. 4 is an enlarged sectional view of a portion similar to a portion of the construction shown in Fig. 3, and showing another embodiment of the present invention.

Because of the lapped or turned about relation of flange portion 7 with respect to flange portion 6, the projecting extremity or projecting edge of the flange 3 is a rounded extremity, as indicated by the reference numeral 9 in Figs. 3 and 4, which extends lengthwise of the flange or edge 3 of door 1. Inasmuch as this projecting extremity is a rounded extremity and thus has a generally convex surface it is readily apparent that the paint thereon, or for that matter the extremity itself, is readily subject to being nicked or chipped when the edge is opened against an obstruction such as a wall, adjacent automobile, or the like.

In order to protect the flange or edge 3, and particularly the rounded extremity 9 thereof from such damage, the protective trim strip 2 is attached to the flange and extends lengthwise therealong as shown in Figs. 1–3. In the embodiment of the present invention shown in Figs. 1–3, the protective trim 2 is a strip of hard material of substantially uniform width throughout its length having a body portion 10 from which extends a tapered longitudinal edge portion 11 which terminates in a thin longitudinally extending edge 12.

Edge 12 is positioned along and engages the projecting extremity 9 of the flange 3 in the manner shown in Figs. 3 and 4. In other words, the protective trim strip 2 engages the projecting extremity 9 of flange 3 throughout a major portion of the length of the flange and extends widthwise of the flange from the projecting extremity 9 back toward the body of the automobile door. In extending widthwise of flange 3, trim strip 2 conforms to the curved contour of the projecting extremity 9 of the flange. Thus, it can be observed from Fig. 3 that the thin tapered portion 11 conforms to the curvature of the rounded extremity 9. By virtue of this construction the trim strip 2 appears to be practically integral with the edge flange 3. Therefore, the trim strip not only performs a protective function but by virtue of its conformity in shape and the fact that it is preferably made of polished stainless steel, performs an ornamental function in enhancing the appearance of the door edge.

In order to retain the trim strip 2 in the position just described, the strip has projecting therefrom a plurality of threaded studs 13 which extend through the flange 3 and to which are attached means such as the nuts 14 whereby the strip 2 is secured firmly in place. In practice it is found that the studs 13 may be located along strip 2 at intervals ranging from 3½ to 5 inches apart and the strip itself, of the type shown in Figs. 1 and 2, will be approximately 24 to 28 inches in length. By providing a stud connection of the type shown the trim strip 2 is positively and fixedly retained in position and the tapered thin portion 11 drawn firmly and maintained firmly against rounded extremity 9 of flange 3. The attachment is so secure that the trim will not become loose or rattle in normal service.

When the automobile door 1 is in closed position as shown in Fig. 3, the protective trim strip 2 covers the otherwise exposed exterior edge surface of flange 3. From an appearance standpoint, the trim strip extends from the very extremity of the edge of the flange toward the body of the door and thus the longitudinally extending vertical edge portion gives the appearance of a continuous strip of protective material which, when the strip is made of polished stainless steel, or some equivalent appearing material, contributes to the over-all appearance of the automobile.

The construction shown in Fig. 4 is essentially the same as that shown in Fig. 3 and hence like reference numerals are used to designate like parts. The only difference between the constructions shown in Figs. 3 and 4 is the means by which the strip 2 is retained in place. In the Fig. 4 construction the strip 2 is retained in place by means of an adhesive layer 15 which is located between the body portion 10 of the strip and the flange portion 7 as is shown in Fig. 4. The adhesive layer 15 may be a suitable rubber base adhesive or the like which has sufficient strength and weather resistance to perform the function intended.

Figure 5:
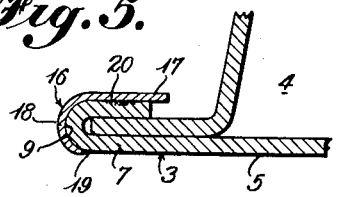
Fig. 5 is a view similar to Fig. 4 showing a further embodiment of the present invention.

The construction shown in Fig. 5 differs from the constructions shown in Figs. 3 and 4 in that, in the Fig. 5 construction, the trim strip practically does not show from the exterior of the automobile when the automobile door is closed. This construction is primarily for use in connection with streamlined swept back body designs where it is desired to avoid breaking the swept back appearance by any bold vertical or substantially vertical strips appearing on the exterior of the automobile body.

Thus, in order to substantially avoid having the trim strip show from the exterior of the automobile when the automobile door is closed, the trim strip, indicated generally by the reference numeral 16, is J-shaped in cross-section as shown in Fig. 5 with the long portion 17 of the J being located at the rear of the flange and the bent portion 18 of the J being located about the rounded extremity 9 of the flange 3. The bent portion 18 of strip 16 terminates in a thinned-down edge 19 which is located just far enough around the rounded extremity 9 of flange 3 so as to protect the generally convex surface of the rounded extremity 9 from damage when the automobile door edge is opened against some obstruction such as a wall or the like. The straight portion 17 of the J-shaped strip 16 extends along the rear side of flange 3 and is connected thereto by any suitable fixedly attaching means such as by spot welding as shown at 20 in Fig. 5. It is obvious that the protective trim strip 16 will be spot-welded to flange or vertical edge 3 at suitable intervals along the length of the flange in the manner indicated for the stud connections 13 shown in Fig. 2.

Figure 6:
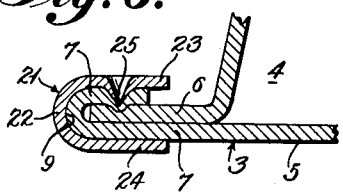
Fig. 6 is a view similar to Fig. 4 showing still another embodiment of the present invention.

The construction shown in Fig. 6 employs a trim strip 21 which is substantially U-shaped in cross-section with the bent portion 22 of the strip engaging and enveloping the rounded extremity 9 of flange 3 throughout a major portion of the length of the flange, and the straight portions 23 and 24 of the strip extending, respectively, along the inner and outer surfaces of flange 3 as shown in Fig. 6. In order to securely retain the trim strip 21 in position, portions of the straight portion 23 of the trim strip are depressed into the metal of the flange 3 as indicated at 25. The depressed portions 25 will be located at spaced intervals throughout the length of the flange in similar manner to the studs 13 shown in Fig. 2.

From the foregoing description, it will be seen that I provide an automobile door edge construction including a protective trim which has particular utility for protecting, and improving the appearance of, the substantially vertical outwardly swinging edge of an automobile door. By virtue of the closely conforming shape of the trim, the door edge construction appears to be a unitary construction whereas it is actually a composite construction made up of the door flange and the trim.

In the construction shown in Fig. 3, for example, the trim may be attached readily either by the automobile owner himself or in an automobile shop. In the construction shown in Fig. 5, for example, wherein it is desired to avoid breaking up the swept-back appearance of an automobile by any bold vertical lines, the trim is especially adapted to be attached at the factory itself when the automobile door is made.

In all of the various embodiments described and illustrated, the trim is secured by positive retaining means which fixedly connect it to the door edge or flange with the result that it does not become displaced or rattle in use. A polished stainless steel strip approximately 0.030 of an inch thick, for example, may be retained by 6–32 studs spaced apart as shown in Fig. 2 at intervals of from 3½ to 5 inches along the length of the door flange. Screws, welding, depressed metal or the like may be used in lieu of studs.

While I have described and illustrated various embodiments of my invention, I wish it to be understood that I do not intend to be restricted solely thereto but that I do intend to cover all modifications thereof which would be readily apparent to one skilled in the art and which come within the spirit and scope of my invention.

What I claim as my invention is:

An automobile door edge construction comprising a flange projecting from and extending along an end portion of the door body in extension of the exterior surface of the door body, the projecting edge of said flange being a rounded extremity spaced from the door body, a substantially J-shaped metal protective trim strip conforming to and engaging the projecting edge of said flange substantially throughout its length, the straight portion of said J-shaped strip extending along and engaging the back of said flange and the bent portion of said J-srip enveloping and engaging the rounded extremity of said flange, said bent portion terminating in a longitudinal edge positioned closely adjacent to the rounded extremity of said flange whereby the trim strip is not readily noticed from the exterior of the car when the door is closed, and a plurality of metallic fastening means connecting said J-shaped strip to said flange.

References Cited in the file of this patent

UNITED STATES PATENTS

| | | |
|---|---|---|
| 1,008,805 | England | Nov. 14, 1911 |
| 1,240,646 | Bakewell | Sept. 18, 1917 |
| 1,800,060 | Farrington | Apr. 7, 1931 |
| 2,146,090 | O'Rourke | Feb. 7, 1939 |
| 2,226,615 | Killen | Dec. 31, 1940 |
| 2,383,575 | Wernig | Aug. 28, 1945 |
| 2,457,312 | Kramer | Dec. 28, 1948 |